United States Patent
Atluri et al.

(10) Patent No.: US 7,606,905 B1
(45) Date of Patent: Oct. 20, 2009

(54) METHOD FOR SERVICE PROCESSOR DISCRIMINATION AND PRECEDENCE IN A VOICE-OVER-INTERNET-PROTOCOL (VOIP) NETWORK

(75) Inventors: Neela R. Atluri, Marlboro, NJ (US); Frederick Murray Burg, West Long Branch, NJ (US); Saul Daniel Fishman, Highland Park, NJ (US); James A. Ibezim, Wayside, NJ (US); Barbara Joanne Kittredge, Brunswick, ME (US); Lauraine M. Schalk-Pizza, Freehold, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 606 days.

(21) Appl. No.: 11/240,073

(22) Filed: Sep. 30, 2005

(51) Int. Cl.
*G06F 15/173* (2006.01)
(52) U.S. Cl. ........................ 709/226; 709/238; 709/230; 709/239; 709/227; 709/207; 370/252; 370/392; 370/468; 370/524; 370/231
(58) Field of Classification Search .................. 709/226
See application file for complete search history.

(56) References Cited

U.S. PATENT DOCUMENTS

| | | | |
|---|---|---|---|
| 5,838,683 A | 11/1998 | Corley et al. | |
| 5,875,234 A | 2/1999 | Clayton et al. | |
| 5,933,490 A | 8/1999 | White et al. | |
| 6,026,087 A | 2/2000 | Mirashrafi et al. | |
| 6,064,653 A | 5/2000 | Farris | |
| 6,185,204 B1 | 2/2001 | Voit | |
| 6,430,176 B1 | 8/2002 | Christie, IV | |
| 6,434,139 B1 | 8/2002 | Liu et al. | |
| 6,470,020 B1 | 10/2002 | Barker et al. | |
| 7,120,139 B1 * | 10/2006 | Kung et al. | 370/352 |
| 2003/0224781 A1 * | 12/2003 | Milford et al. | 455/426.1 |

FOREIGN PATENT DOCUMENTS

EP  0 848 560 B1  4/2002

* cited by examiner

*Primary Examiner*—Jude J Jean Gilles

(57) ABSTRACT

A method and apparatus for identifying and prioritizing applications and application servers in a Voice over IP network is disclosed. In a first embodiment, elements of signaling information are extracted from a call and are mapped to parameters associated with the call. These mapped parameters are then used by a service broker in a VoIP network to identify one or more application servers adapted to process the values of the respective parameter. The service broker may illustratively identify the application servers by a pointer to permit flexible reassignment of processing of a given parameter. The matched pointer/parameter combinations are then mapped to a precedence index. Then, according to this precedence index, the aforementioned pointers are mapped to specific addresses of application servers and the elements of signaling information are forwarded to those addresses for processing of applications.

20 Claims, 6 Drawing Sheets

| SERVICE | REQUIRED APPLICATION SERVER | PRECEDENCE |
|---|---|---|
| IPC ORIGINATING | IPC AS | 1 |
| CLS ORIGINATING | CLS AS | 2 |
| ORIGINATING 8YY | 8YY AS | 3 |
| TCS | TCS AS | 4 |
| PPC | PPS AS | 5 |
| VBT SDN | SDN AS | 6 |
| VoMS | VoMS AS | 7 |
| IPC TERMINATING | IPC AS | 8 |
| CLS TERMINATING | CLS AS | 9 |

METHOD FOR SERVICE PROCESSOR DISCRIMINATION AND PRECEDENCE IN A VOICE-OVER-INTERNET-PROTOCOL (VOIP) NETWORK

CROSS REFERENCE TO RELATED APPLICATIONS

This patent application is related to U.S. patent application Ser. No. 11/240,344, entitled "Method for Maintaining Signaling History in a Voice-over-Internet-Protocol (VoIP) Network," filed simultaneously herewith, which is incorporated by reference herein in its entirety.

BACKGROUND OF THE INVENTION

Telecommunication services for voice and multimedia (e.g., audio, video, and data) have traditionally been provided using networking technologies such as public switched telephone networks (PSTN). Typically, in such networks, voice signals are converted to digital form and time division multiplexing (TDM) is used to allocate different conversations to periodic time slots. More recently, other networking technologies have been used to carry voice and multimedia information. Such technologies include internet protocol (IP), a formal set of rules for sending data across the internet; frame relay (FR), a telecommunication service providing variable-sized data packets for cost-efficient data transfer; and asynchronous transfer mode (ATM), a high speed networking standard. Such networks provide a single, common and shared infrastructure, thus flexibly enabling a potentially wide variety of new applications and services for customers. Regardless the technology used, as traditional PSTN networks migrate toward other networking technologies, the flexibility of those technologies allows service providers to offer a wide variety of new and advanced application services.

Many telecommunications providers are selecting IP as the access technology for new telecommunications networks that carry voice, data and multimedia information. Such networks are often referred to as Voice over IP (VoIP) networks. Many such providers are using a core network that relies upon the well-known Session Initiation Protocol (SIP) for signaling and call flow operations. Such SIP-based VoIP networks are advantageous in that they use the same access technology (IP) as many other networks, such as the Internet, which facilitates transmitting information to a wide range of destinations.

As is well-known, application servers are used in VoIP networks to provide any of a multitude of services to calls such as, illustratively, 8YY, call transfer and interactive voice response services. Typically, when a call is placed in a VoIP network, a network element, commonly referred to as a service broker (SB), refers to a database to determine which services should be available to the call. These services may be indicated by a parameter of the call, such as the calling party, the called party or any another parameter associated with the call. Based on these parameters, the SB invokes an appropriate application server in order to support the desired services. It is often the case that multiple services are applicable to a single call. Thus, when this is the case, different classes of services would be given priority. For example, typically all services associated with a calling party would be performed first, followed by the services associated with a called party. To provide such multiple services, the history of which services were performed was typically maintained by a switch or a particular application to ensure proper processing of the applications. However, maintaining such a history was complicated and introduced delay in signal processing. Therefore, service providers have typically used one application server on a call. As a result, in some implementations, certain services were mutually exclusive in that they could not be used with certain other services. To solve this limitation, in other implementations an application server would host multiple services in order to provide these services to a call while, at the same time, eliminating the need to access multiple application servers. However, this led to the situation where the same service would be redundantly hosted on different application servers.

SUMMARY OF THE INVENTION

The present inventors have realized that limiting the number of applications permitted on a call is undesirable as it lowers the level of service provided to customers. Similarly, hosting the same application on a large number of application servers is also undesirable as such hosting requires additional resources and is, therefore, inefficient. Thus, the present inventors have also realized that it would desirable to utilize multiple services per call while, at the same time, eliminating the foregoing redundancy/inefficiency. However, the difficulty remains as to how to determine which application servers are needed and what precedence each application server or service should take.

The present invention essentially solves the aforementioned problems. Specifically, the present inventors have invented a method and apparatus for identifying and prioritizing applications and application servers in a Voice over IP network. In a first embodiment, elements of signaling information are extracted from a call and are mapped to parameters associated with the call. These mapped parameters are then used by a service broker in a VoIP network to identify one or more application servers adapted to process the values of the respective parameter. The service broker may illustratively identify application servers by a pointer to permit flexible reassignment of processing of a given parameter. The matched pointer/parameter combinations are then mapped to a precedence index. Then, according to this precedence index, the aforementioned pointers are mapped to specific addresses of application servers and the elements of signaling information are forwarded to those addresses for processing of applications.

DETAILED DESCRIPTION

Figure 1:
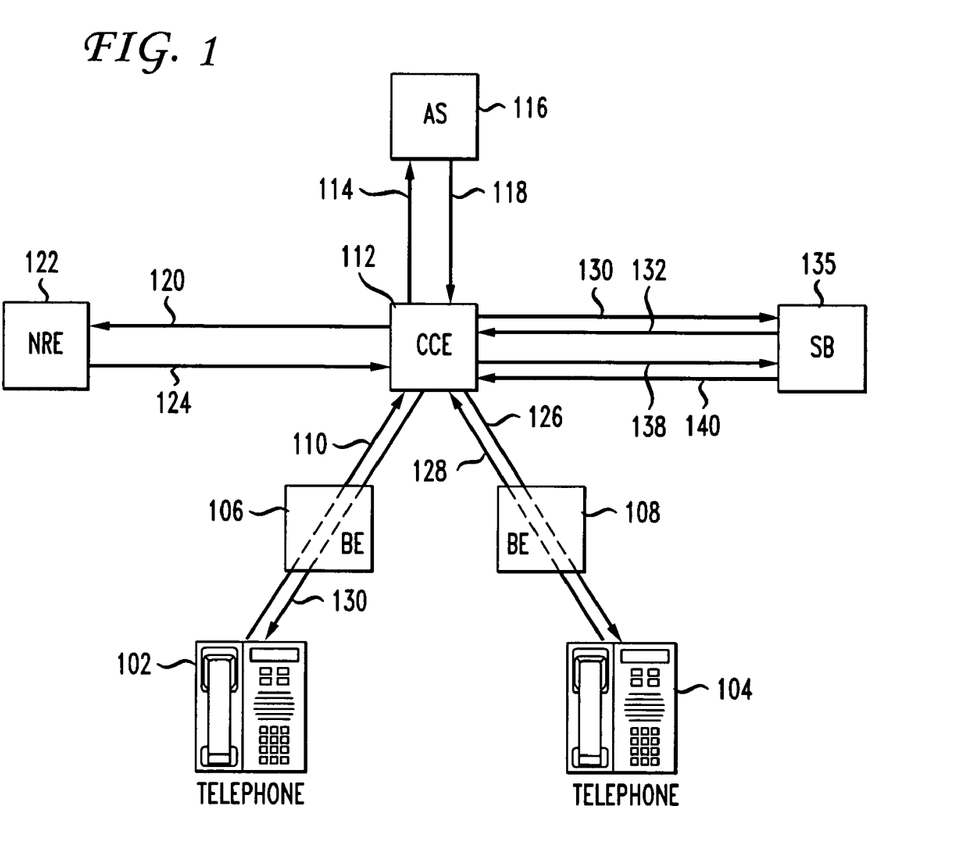
FIG. 1 shows an IP network adapted for use in a VoIP network.

FIG. 1 shows an IP network in which one embodiment of the present invention may be implemented. The network utilizes the Session Initiation Protocol (SIP) in order to set up connections (e.g., VoIP calls) between users. SIP is a well known application-layer control protocol used to establish, modify and terminate sessions such as IP telephony calls. SIP is described in detail in Internet Engineering Task Force (IETF) Request for Comments (RFC) 3261; SIP: Session Initiation Protocol; J. Rosenberg, H. Schulzrinne, G. Camarillo, A. Johnston, J. Peterson, R. Sparks, M. Handley, E. Schooler; June 2002, which is incorporated by reference herein. The details of SIP will not be described herein, as the protocol is well known to those skilled in the art.

With reference to FIG. 1, it is to be understood that the network elements shown in FIG. 1 are logical entities that may be implemented in various hardware configurations. For example, these network elements may be implemented using programmable computers which are well known in the art. Such programmable computers would have the required network interfaces to allow for network communication, as well as appropriate software for defining the functioning of the network elements. Such software is executed on one or more computer processors which control the overall operation of the network elements via execution of such software. The detailed hardware and software configuration of the network elements will not be described in detail herein. One skilled in the art of data networking and computers could readily implement such network elements given the description herein. As used herein, a network element refers to a logical entity which performs a network function. A network node refers to the computing platform on which a network element is implemented.

Referring now to FIG. 1, assume that IP enabled telephone 102 wishes to initiate an IP telephony call to IP enabled telephone 104. In FIG. 1, telephone 102 is connected to a border element (BE) 106 which provides telephone 102 access to the IP network. Similarly, telephone 104 is connected to BE 108 which provides telephone 104 access to the IP network. One skilled in the art will recognize that IP enabled telephones 102 and 104 may communicate with BEs 106 and 108, respectively, via the SIP protocol or, alternatively, may utilize any other suitable IP telephony protocol, such as the well-known H.323 protocol. One skilled in the art will also realize, that, depending upon the protocol used by telephones 102 and 104, BE 106 and/or BE 108 may also perform translation services from that protocol to the protocol used by the core service provider network which is, illustratively the SIP protocol. For the purposes of the description herein below, it is assumed that telephones 102 and 104 utilize the SIP protocol.

In the example of FIG. 1, the transaction begins by telephone 102 sending an INVITE request 110 addressed to telephone 104's Uniform Resource Identifier (URI) which identifies telephone 104. The INVITE request contains a number of header fields which are named attributes that provide additional information about a message. The details of an INVITE are well known and will not be described in detail at this point.

The INVITE message 110 is received at the call control element (CCE) 112. The CCE 112 performs the functions of interfacing with other network elements such as Border Elements (BE), Service Brokers (SB), Application Servers (AS), Media Servers (MS), Network Routing Engines (NRE), and others, to provide the necessary functions to process a call request. The CCE 112 determines whether special feature processing is required by the call by sending an INVITE message 130 to service broker (SB) 135. It is noted that, while the SB function is a separate logical function from the CCE, the SB function may be contained in the CCE network element or a standalone network element. Examples of special feature processing are 8YY (e.g., 800) calls, Software Defined Network (SDN) calls, call transfer services or interactive voice response services, etc. The SB 135 determines whether such special processing is required based on call information it receives in the INVITE message 130. Typically, the SB refers to a database to determine which features are associated with the value of a particular parameter associated with the call, such as the calling party, the called party or any another parameter associated with the call. If special feature processing is required, the SB 135 determines the appropriate application server to provide the special feature processing for the call. The SB 135 sends a REDIRECT message 132 to the CCE 112 indicating the IP address of the appropriate application server to provide the feature processing. The CCE 112 sends a query (an SIP INVITE) 114 to the application server identified by the SB 135, for example AS 116 in order to insert the AS into the signaling path for feature processing.

In some instances, feature processing is required for multiple services in a single call. As discussed above, when this is the case, in prior attempts different classes of services (e.g., calling party services, called party services, etc) were typically given different priorities. For example, in some implementations, all services associated with a calling party were performed first, followed by the services associated with a called party. For the reasons discussed above, it was undesirable to use more than one AS per call and, as a result, certain services were mutually exclusive and could not be used with certain other services. Alternatively, to support multiple services, the AS used for the call would sometimes host multiple services. However, as also discussed previously, such exclusive/redundant use of ASs is inefficient and costly.

Figure 2:
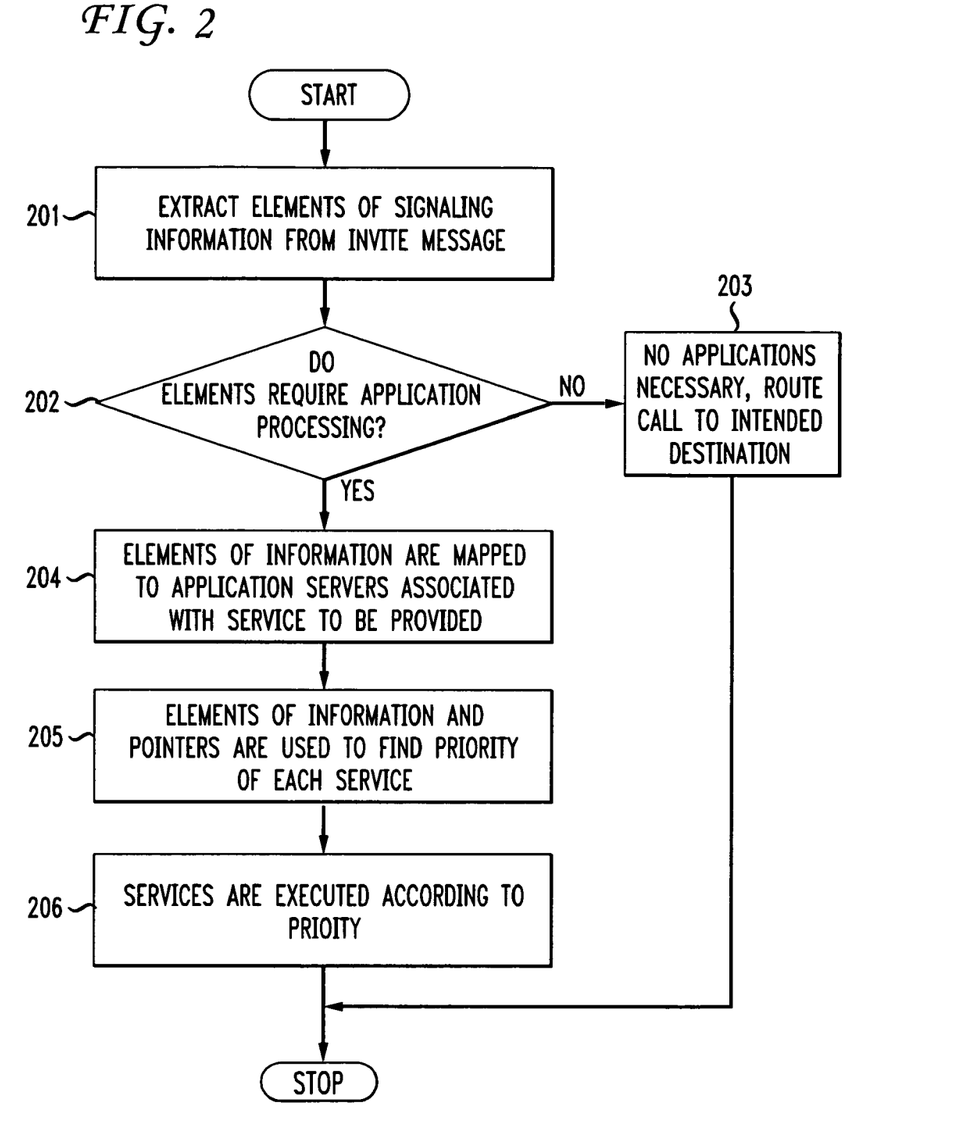
FIG. 2 shows a general method useful with the VoIP network of FIG. 1 in accordance with one embodiment of the principles of the present invention.

FIG. 2 shows a general method of one embodiment in accordance with the principles of the present invention whereby multiple services may be provided to a call in a VoIP network while, at the same time, allowing for multiple application servers to be efficiently utilized to provide these multiple services. Specifically, while prior feature processing systems prioritized particular services based on the aforementioned classes, the present inventors have realized that it may be desired to deviate from such a class-based prioritization. In one illustrative example, it may be desirable to process some called party-related features with calling party features. Additionally, it may be desirable to tailor specific ASs to process specific features.

Referring to FIG. 2, at step 201, elements of signaling information are extracted from an INVITE message coming, for example, from IP-enabled telephone 102 in FIG. 1. These elements may be, for example, information related to the Billing ID, Calling Party Information, Called Party Information, etc. Next, at step 202, it is determined whether the elements of signaling information extracted from the INVITE require application processing by, for example, looking up the elements of signaling information in a database to determine which services, if any, are associated with the above elements of signaling information. If no matches are found then, at step 203, no applications are necessary for a call and the call is routed to its intended destination or for further processing. If, on the other hand, matches are found at step 202, then, at step 204, the elements of information are mapped to application servers associated with a particular service to be provided. In one illustrative example, pointers may be used to indicate which application server is to be referred to for invoking a particular service associated with a particular element of signaling information. Next, at step 205, the elements of information and the pointers are used to find the priority of each service relative to all the services to be provided to a particular call. Finally, at step 206, the services are executed according to the priority determined at step 205.

Figure 3:
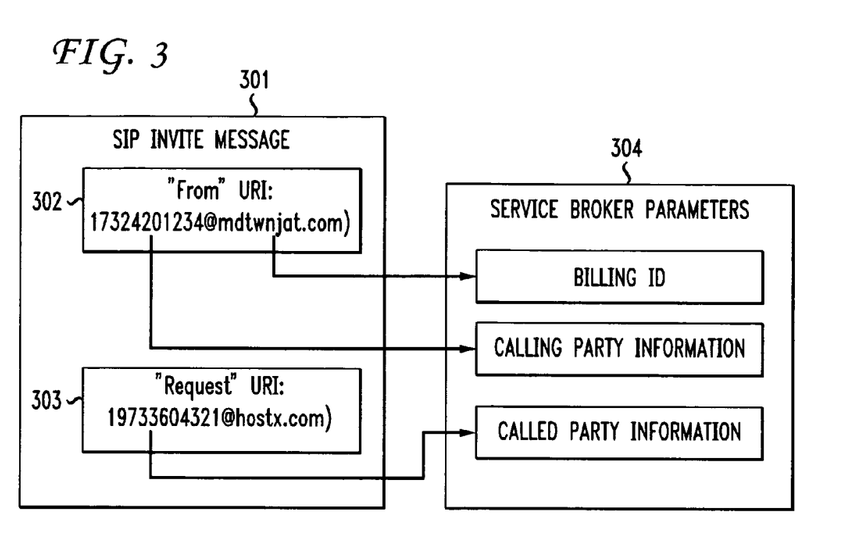
FIG. 3 shows one exemplary illustration of how elements of signaling information may be mapped to parameters associated with calls in the VoIP network of FIG. 1.

FIG. 3 is an illustration of one exemplary embodiment, the aforementioned extraction of elements of signaling information and the mapping of those elements to parameters associated with the calls. Specifically, in the illustrative example of extracting elements from a SIP INVITE message, that message will contain Uniform Resource Identifiers (URIs), illustratively in the form telno@host.com. Such URIs are well known and, therefore, will not be described further herein. Illustratively, there are two URI's associated with each call representing the calling party URI and the called party URI respectively. The calling party URI (i.e., the "From" URI) is representative of the originating address/calling party of the message and is, in this particular example, 17324201234@mdtwnjat.com. The called party URI ("Request" URI) is representative of the destination address/called party of the message and is, in the example of FIG. 3, 19733604321@hostx.com. Elements of information may be extracted from both the From URI and the Request URI and may be mapped to SB parameters for use in processing call features. Specifically, 17324201234 in this example (the calling party phone number) is an element that is classified as Calling Party Information; mdtwnjat.com is classified as Billing ID; and 19733604321 (the called party phone number) is classified as Called Party Information. As discussed previously, one skilled in the art will recognize that, while FIG. 3 shows the illustrative example of a SIP INVITE message, similar information may be extracted from an H.323 originating call by, for example, a border element (BE) that is used to convert the signaling messages from the H.323 format to the SIP format. In this case, the information translated from the H.323 call will be extracted and mapped to the SB parameters as discussed in association with FIG. 3.

Figure 4:
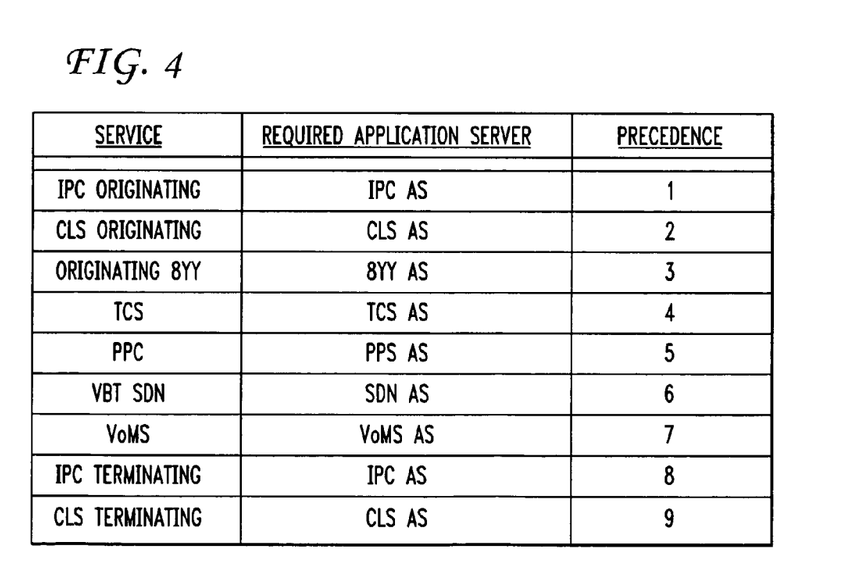
FIG. 4 shows how a table may be used to identify application servers for processing of calls in the VoIP network of FIG. 1.

Once this signaling information is extracted and mapped to SB parameters, the SB will then perform a search in one or more databases that maintain data indicating which services correspond to the values of the SB parameters. For example, the SB will search the database to determine whether any services are associated with the calling party number 17324201234 and then will check for any services that may be applicable to any other value of an SB parameter. One skilled in the art will recognize that a multitude of services may be applicable to a call. For example, FIG. 4 shows a table illustrating some of these services, specifically IP Centrex (IPC) Originating; Consumer Local Service (CLS) originating; originating 8YY (so-called "toll free" calls); Transfer Connect Service (TCS) (a call transfer service); Prepaid Card (PPC); Voice Breakthrough (VBT); Software Defined Network (SDN); Voice over Managed Services (VoMS); IPC Terminating; and CLS Terminating. In some cases, these services are specific examples of services that could be provided by particular telecommunication service providers and are well known to one skilled in the art. Therefore, these services will not be discussed further herein. One skilled in the art will also recognize that many other service providers may have similar services with different names. This list is merely exemplary and is not exhaustive—many other services may be applicable to a particular call.

The table of FIG. 4 also shows that, upon the detection of a particular criterion associated with each of the above services, a corresponding AS will be identified for further processing. For example, for an IPC Originating call, when the SB detects that the call originated from an IPC URI/address, it will determine that an IPC AS is required. Similarly, when the dialed number is an 8YY number, the SB will determine that an illustrative 8YY AS is required. In one illustrative embodiment in accordance with the principles of the present invention, the database of services and associated AS's may also contained a predefined order of precedence for that service. Thus, as shown in the illustrative example of FIG. 4, services related to IPC originating, CLS originating and 8YY calls may receive the highest priority since those services are typically fundamental services related to call set up. On the other hand, IPC terminating and CLS terminating services are typically the lowest precedence as those services are typically the last services performed in a call prior to termination of the call. While FIG. 4 illustrates one illustrative precedence ordering of services, one skilled in the art will recognize that any desirable precedence can be assigned to services. Additionally, one skilled in the art will recognize that a precedence may be established globally for all calls or, alternatively, a precedence may be established separately for each call type or even independently for individual calls.

Figure 5:
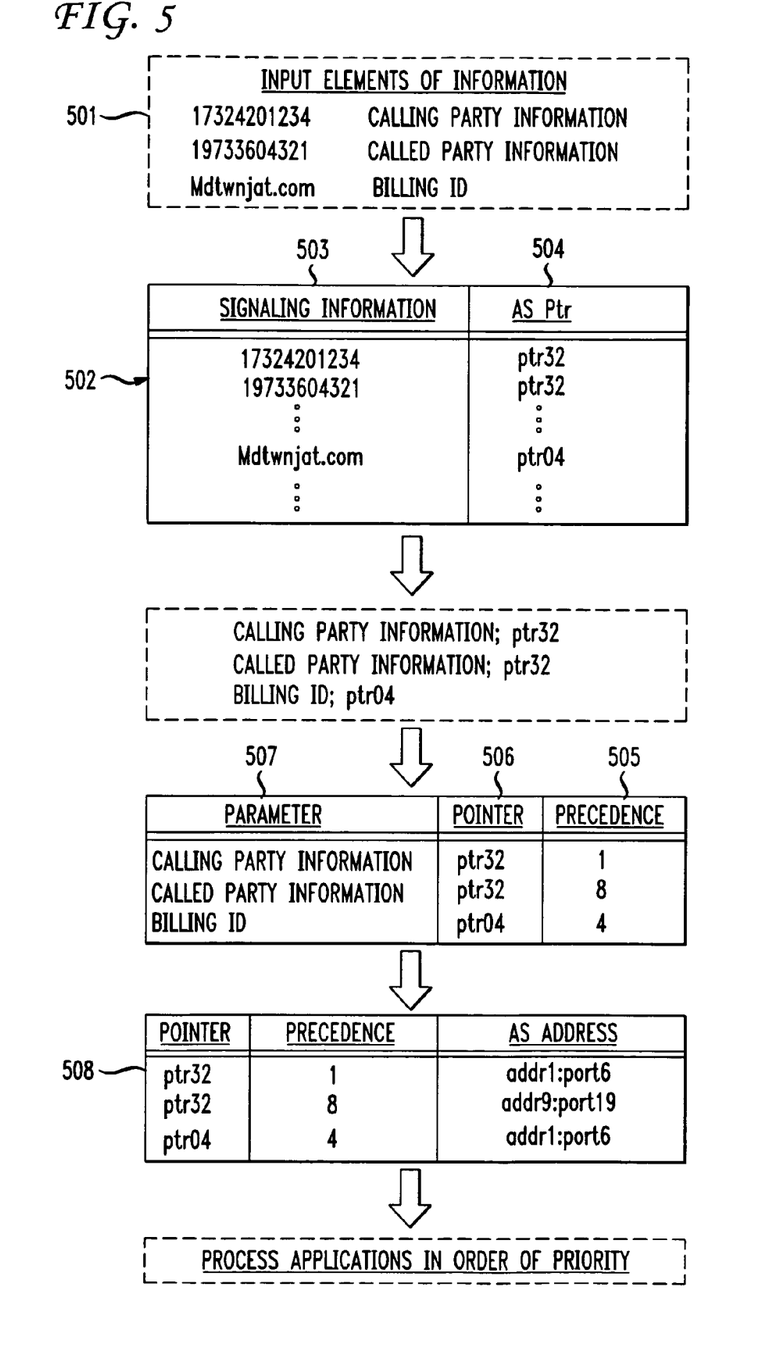
FIG. 5 shows how a plurality of tables may be used to invoke applications from a plurality of application servers in the VoIP network of FIG. 1.

FIG. 5 shows how a plurality of tables may be used to invoke applications from a plurality of AS's in a VoIP network. As discussed above, elements 501 of signaling information are extracted from an INVITE message and used by the SB in determining what applications are required for a call and the precedence of each application. In making this determination, the SB will illustratively refer to a database or table to find any matches between the elements and applications that are to be provided. This database is represented by table 502. Table/database 502 illustratively contains records that relate the values of the extracted elements with application servers corresponding to those values. For example, as seen in column 503 of table 502, the element 17324201234, representing the calling party number, is mapped to pointer 32 ("ptr32") in column 504 of table 2. Pointer 32 illustratively is associated with a particular application server. It is desirable to use pointers instead of actual addresses of application servers table 501 in order to reduce the amount of information necessary to be stored in this table as well as to permit flexibility in assigning application servers to particular elements of signaling information. Such an approach, for example, allows a different application server to be assigned to a pointer without modifying table 502. One skilled in the art will recognize, however, that the addresses of the application servers may be used in this table. Any such implementation whereby elements of signaling information are related to a plurality of application servers for a single call are intended to be encompassed by the teachings herein.

Once the elements of signaling information are mapped to individual AS pointers, the SB knows both an application server and an application classification (e.g., calling party information, called party information, Billing ID, etc). The SB can then use this information to refer to another table, such as table 505, which illustratively relates the pointer number (e.g., ptr32 in FIG. 5) coupled with the parameter classification (e.g., calling party information) to identify a precedence index. For example, referring to table 505, application server pointer ptr32 in column 506 coupled with call parameter classification Calling Party Information in FIG. 507, corresponds to a precedence index of 1, or the highest precedence in the chart as shown. The SB relates all pointer/classification matches to a precedence index in a similar fashion.

Once a precedence has been assigned to each pointer/classification match, then the SB can use this prioritized information to invoke applications on one or more application servers according to the assigned precedence. For example, the SB will refer to the highest matched precedence as determined by referring to table 505 and will then match the pointer information (e.g., ptr32) to an address associated with a particular application server and/or port. For example, referring to table 508, the SB will first retrieve address information for the pointer/classification match of ptr32 and Calling Party Information. As shown in table 508, the address retrieved is addr1:port6 where the addr1 and port6 variables correspond to an address (such as an IP address) and a port on an illustrative address server in a network. The SB then sends a REDIRECT message to the CCE. This REDIRECT message is addressed to the application server retrieved from table 508 and contains the signaling element corresponding to the parameter/classification having the highest precedence match. Once the application server at addr1:port6 has completed processing of a service/application, the application server will then forward control of the processing back to the SB via a REDIRECT message. The SB will then process the remaining pointer/classification matches as discussed above in accordance with the precedence of those matches. Once all processing of services is complete, the SB will send a REDIRECT message to the CCE for further processing and routing of the call.

One skilled in the art will recognize, in light of the foregoing, that in order to process the matched pointer/classification matches, it is necessary to maintain a record of which applications have been processed. If such a record is not maintained, then a looping situation may occur where the SB repeatedly invokes the same AS even though that AS has already processed the call and is no longer needed. As discussed previously, prior attempts stored this information at a switch or within a particular application, which was resource intensive, complicated and introduced delay in signal processing. Therefore, the present inventors have invented a method whereby signaling information is not stored at a switch or within a particular application in the network. Instead, in one embodiment in accordance with the principles of the present invention, a signaling history is carried with the call as it travels between the SB, the CCE and the AS's. In this manner, the SB can prevent looping, can determine which pointer/parameter matches still need to be processed and can determine when all such matches have been processed. This signaling history includes, illustratively, the individual AS address and the precedence information used by the SB to make these determinations. The signaling history may be, for example, carried with the message in SIP VIA headers. The format, application and use of SIP VIA headers in VoIP networking is well known. Typically, various SIP messages (e.g., INVITE and REDIRECT messages) in prior attempts relied on VIA messages to carry address information related to the origination network element and/or intermediate network elements that facilitated replies to, for example, an originator of a message. In such an attempt, the VIA header would contain the network address of any intervening network nodes between the originator and the recipient of a message that might require a reply. Network elements receiving this address information, illustratively, used the addresses to send appropriate reply and signaling information to those intermediate network elements. For example, a typical prior SIP VIA header would appear as a line item in the SIP message, and would appear as:

Via: SIP/2.0/UDP 120.100.101.095:5060 where the phrase "SIP/2.0/UDP" indicates the protocol(s) used at a particular network element and the phrase 120.100.101.095:5060 corresponds to the network address and port of an intermediate network element to which replies and signaling information should be sent.

In accordance with the principles of the present invention, as discussed above, an illustrative SIP VIA header could be added to a SIP message by the AS, CCE or SB each time an application was successfully performed for a given call. For example, when the SB sends a REDIRECT message to the CCE to forward a call to an application server, the SB could at the same time add a VIA header to the REDIRECT message that would contain both the address of the application server and the precedence index of that address server. Thus, an illustrative VIA header could appear as:

Via: SIP/2.0/UDP 122.102.103.100:5040 1 where the phrase SIP/2.0/UDP is as described above, the phrase 122.102.103:100:5040 is the address and port of the address server, and the number 1 is the precedence index, indicating that this particular address server is the first in precedence. This VIA header will be carried in the message to the address server and, illustratively, once the application has successfully been performed, that header can be returned in the REDIRECT message from the address server to the CCE and then to the SB. Once the SB receives the message, it checks to determine if any applications have been performed previously and, if so, will check the latest precedence index in the headers. The SB will thus be able to determine which applications have been performed and will, therefore, prevent the aforementioned looping.

One skilled in the art will recognize that many different implementations of carrying such signaling information are possible. Specifically, different protocols could be used (e.g., H.323, MEGACO, etc) which will dictate that other types of headers be used. Additionally, this signaling history information may be inserted directly into a message body instead of inserting it into a header. Finally, a new parameter may be identified that is maintained separately from the message. For example, a flag may be set in any of the aforementioned tables or another table each time an application is invoked and used by the SB each time a message is returned from an application server for application processing. Each AS processor accessed on a call will, illustratively, insert its identity in a new VIA header prior to sending it back to the CCE for further processing. The CCE will access the SB which will then use the information contained in all VIA headers, along with its tables and the previously described logic, to determine the next step for call processing, e.g., whether another application is to be invoked or, alternatively, whether the call is ready for further processing and routing by the CCE.

Figure 6:
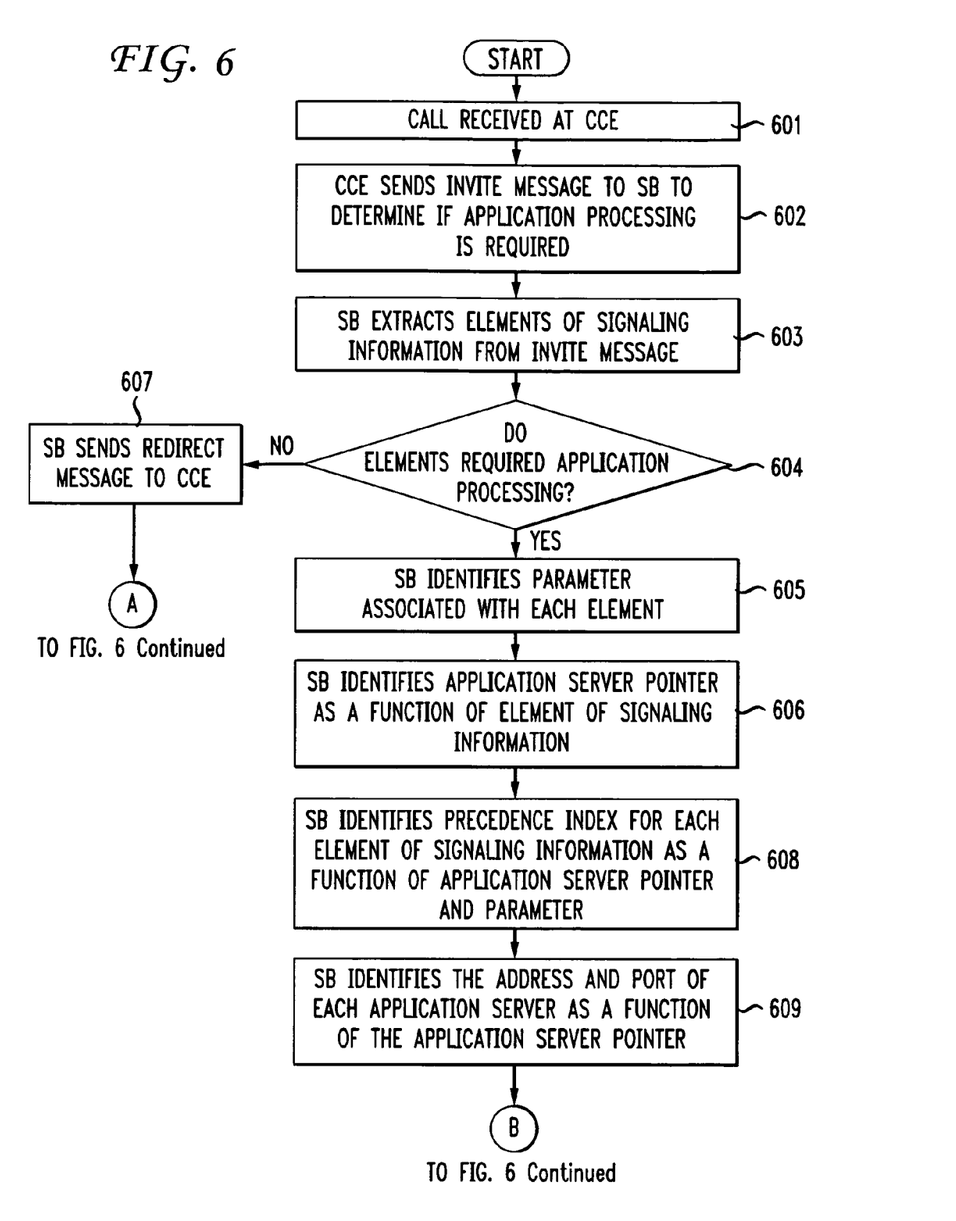
FIG. 6 shows a detailed method of one embodiment in accordance with the principles of the present invention.

FIG. 6 shows a detailed flow chart of a method in accordance with the principles of the present invention as discussed above. At step 601, a call is received by the CCE (illustratively from a border element such as border element 106 in the network). At step 602, the CCE sends an INVITE message to the SB to determined if application processing if required. In response, at step 603, the SB extracts signaling information from the message and, at step 604, determines if application processing is required by, for example, looking up the elements of signaling information in a database. If not, then at step 607, the SB sends a REDIRECT message to the CCE and, at step 619, the call is forwarded to its intended destination.

If, on the other hand, the determination is made at step 604 that the signaling elements do require application processing, at step 605, the SB identifies a parameter (such as the parameter "Calling Party Info" discussed above). At step 606, the SB identifies the application server corresponding to the element of signaling information and the parameter. This server is, illustratively, identified by a pointer. At step 608, the SB identifies the precedence index for each element of signaling information, parameter and application server. This precedence index information is, for example, selectively assigned prior to the operation of the system to provide priority to specific types of elements of signaling information/parameters. At step 609, the SB identifies (once again, for example, by referring to a database/table) the address and port of each application server to provide services to the call as a function of the application server pointer. Then, at step 611, the SB creates an ordered list of applications to be performed as a function of the precedence index assigned to each application server in step 608. Then, at step 612, the SB sends a REDIRECT message to the CCE in order to forward the call to identified application servers according to the assigned precedence. As discussed above, this message illustratively includes a VIA header that contains the address and precedence of the application server to provide features to the call. When the CCE receives this message, then at step 613, the CCE sends an INVITE message, also carrying the same VIA header, to the identified application server in order to provide the respective feature(s) needed for the call. At step 614, the application server processes the call. Once the application server has completed providing the features, using well-known methods, then at step 615, the application server sends a REDIRECT message containing the address and precedence information to the CCE. Then, at step 617, the CCE sends the message and VIA header to the SB for determination whether any other features are to be provided. At step 618, the SB determines whether all applications have been performed. If so, at step 619, the call is forwarded to its intended destination. If, on the other hand, the determination is made at step 618 that all applications have not been provided, at step 621 the SB identifies the next application server required according to the aforementioned precedence index and, at step 620, sends a REDIRECT message to the CCE to provide features from the next application server on the precedence list. Once again, the SB will, for example, add a VIA header to the REDIRECT message to indicate the address and precedence index associated with the application server. Then, the method proceeds as described above beginning once again with step 613 until all features have been provided to the call.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, in the illustrative examples of the above description, an AS always responds to the CCE with a REDIRECT message. One skilled in the art will recognize that this is the case when a particular service permits the AS to act as a Redirect server. However, if that service requires the AS to act as a Back-to-Back User Agent (B2BUA), the AS would respond with an INVITE message instead of a REDIRECT message. Additionally, one skilled in the art will also recognize that all components of a VoIP network as described above are functional in nature and various implementations and functional relationships between those components may be substituted with equally advantageous results. For example, a CCE may perform as a well known SoftSwitch and/or a Call Server, such as a Call Server Control Function in a well-known IP Multimedia Subsystem. Those skilled in the art could implement various other feature combinations without departing from the scope and spirit of the invention. For example, there are many other situations, in addition to those described herein, in which an application server may determine that it is no longer required in the signaling path and may therefore remove itself from the signaling path.

The invention claimed is:

1. A method for use in providing communication services in a packet-based communication network, said method comprising:
   extracting one or more elements of signaling information from a message in said network, said one or more elements associated with at least a first parameter associated with a service broker;
   identifying a plurality of application servers as a function of said one or more elements, each application server in said plurality adapted to provide one or more communication services in said network;
   assigning a priority to each application server in said plurality, said priority a function of said communication service to be provided and said at least a first parameter; and
   invoking each application server in said plurality according to said assigned priority in order to provide said one or more communication services.

2. The method of claim 1 further comprising:
   prior to said step of identifying, determining whether said elements require application processing.

3. The method of claim 1 wherein said step of identifying a plurality of application servers comprises identifying an application server pointer associated with each application server in said plurality of application servers.

4. The method of claim 3 further comprising identifying an address and a port associated with each application server as a function of said application server pointer.

5. The method of claim 1 wherein said step of assigning comprises creating an ordered list of applications to be performed.

6. The method of claim 5 wherein said step of assigning comprises assigning a precedence index to each element of signaling information.

7. The method of claim 6 wherein said ordered list is created as a function of said precedence index assigned to each element of signaling information.

8. The method of claim 1 wherein said step of invoking comprises:
   receiving a first message from a first application server that has completed application processing for a call; and
   determining that processing of said call by a second application server is desired; and
   sending a second message to said second application server to invoke said processing of said call by said second application server.

9. The method of claim 8 wherein said step of determining comprises identifying as a function of said assigned priority the next application server in which said call is to be forwarded to.

10. The method of claim 1 further comprising:
    determining that all applications to be applied to a call have been performed; and
    forwarding said call to an intended destination.

11. An apparatus for use in providing communication services in a packet-based communication network, said apparatus comprising:
    means for extracting one or more elements of signaling information from a message in said network, said one or more elements associated with at least a first parameter associated with a service broker;
    means for identifying a plurality of application servers as a function of said one or more elements, each application server in said plurality adapted to provide one or more communication services in said network;

means for assigning a priority to each application server in said plurality, said priority a function of said communication service to be provided and said at least a first parameter; and means for invoking each application server in said plurality according to said assigned priority in order to provide said one or more communication services.

12. The apparatus of claim 11 further comprising:

means for determining whether said elements require application processing.

13. The apparatus of claim 11 wherein said means for identifying a plurality of application servers comprises means for identifying an application server pointer associated with each application server in said plurality of application servers.

14. The apparatus of claim 13 further comprising means for identifying an address and a port associated with each application server as a function of said application server pointer.

15. The apparatus of claim 11 wherein said means for assigning comprises means for creating an ordered list of applications to be performed.

16. The apparatus of claim 15 wherein said means for assigning comprises means for assigning a precedence index to each element of signaling information.

17. The apparatus of claim 16 further comprising means for creating said ordered list as a function of said precedence index assigned to each element of signaling information.

18. The apparatus of claim 11 wherein said means for invoking comprises:

means for receiving a first message from a first application server that has completed application processing for a call; and means for determining that processing of said call by a second application server is desired; and means for sending a second message to said second application server to invoke said processing of said call by said second application server.

19. The apparatus of claim 18 wherein said means for determining comprises means for identifying as a function of said assigned priority the next application server in which said call is to be forwarded to.

20. The apparatus of claim 11 further comprising:

means for determining that all applications to be applied to a call have been performed; and means for forwarding said call to an intended destination.

* * * * *